United States Patent
Miyazawa

(10) Patent No.: US 10,250,808 B2
(45) Date of Patent: Apr. 2, 2019

(54) IMAGING APPARATUS AND CONTROL METHOD THEREFOR

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/674,617

(22) Filed: Aug. 11, 2017

(65) Prior Publication Data

US 2018/0063439 A1 Mar. 1, 2018

(30) Foreign Application Priority Data

Aug. 30, 2016 (JP) .................. 2016-167910

(51) Int. Cl.
*H04N 5/232* (2006.01)
*G06T 7/246* (2017.01)

(52) U.S. Cl.
CPC ....... *H04N 5/23261* (2013.01); *H04N 5/2327* (2013.01); *H04N 5/23209* (2013.01); *H04N 5/23254* (2013.01); *H04N 5/23258* (2013.01); *H04N 5/23287* (2013.01); *G06T 7/246* (2017.01); *G06T 2207/30241* (2013.01); *G06T 2207/30244* (2013.01)

(58) Field of Classification Search
CPC ........... H04N 5/23261; H04N 5/23287; H04N 5/23258; H04N 5/23254; G06T 7/246; G06T 2207/30244; G06T 2207/30241
See application file for complete search history.

(56) References Cited

U.S. PATENT DOCUMENTS

| 5,629,735 | A  | * | 5/1997  | Kaneda   | H04N 5/23212 348/345 |
| 7,929,042 | B2 | * | 4/2011  | Terashima | G03B 13/00 348/345 |
| 8,031,229 | B2 |   | 10/2011 | Mori     |  |
| 8,692,888 | B2 | * | 4/2014  | Miyazaki | H04N 5/23219 348/169 |
| 8,866,917 | B2 | * | 10/2014 | Noguchi  | H04N 5/23258 348/208.11 |
| 9,402,019 | B2 | * | 7/2016  | Yata     | G02B 7/36 |
| 2013/0162847 | A1 | * | 6/2013 | Miyazawa | H04N 5/23248 348/208.1 |

FOREIGN PATENT DOCUMENTS

| JP | 2006-317848 A | 11/2006 |
| JP | 2008-136174 A | 6/2008 |

* cited by examiner

*Primary Examiner* — Lin Ye
*Assistant Examiner* — Chriss S Yoder, III
(74) *Attorney, Agent, or Firm* — Venable LLP

(57) ABSTRACT

An imaging apparatus is provided that includes a camera body on which a lens device is detachably mounted; a shake detection unit configured to be inside the camera body; and a control unit configured to determine an exposure time at a time of panning, wherein the control unit determines the exposure time at the time of panning based on a shake detection signal outputted by the shake detection unit.

9 Claims, 10 Drawing Sheets

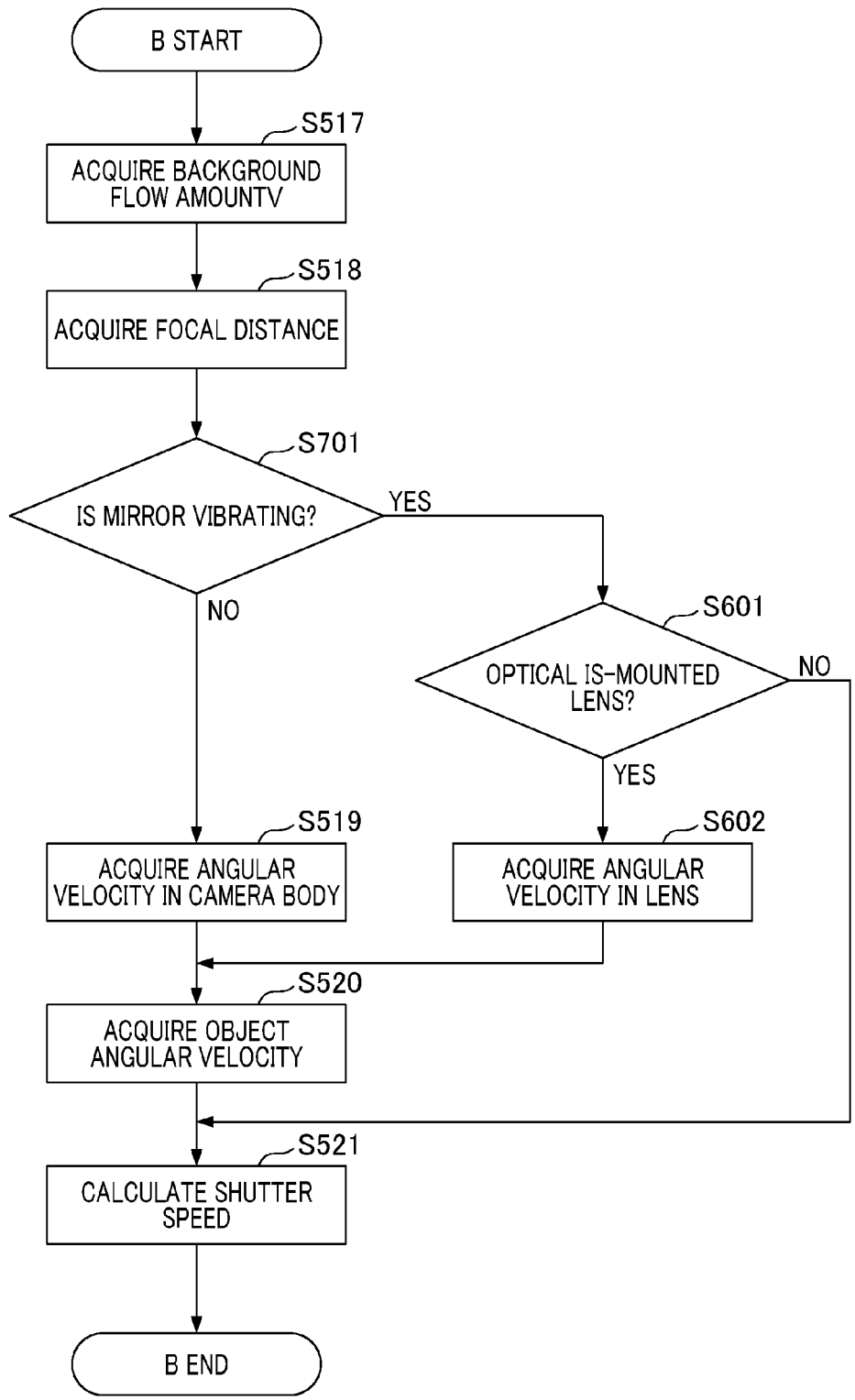

IMAGING APPARATUS AND CONTROL METHOD THEREFOR

BACKGROUND OF THE INVENTION

Field of the Invention

The present invention relates to an imaging apparatus and a control method therefor.

Description of the Related Art

There is panning as one of camera photographing methods. The panning is, for example, a scheme of photographing while causing a camera to follow a motion of an object which is moving in the horizontal direction. At the time of panning, a shutter speed is generally set to a greater number of seconds and decreased to produce a dynamic feeling in the object. As the shutter speed is decreased, a flow level of a background increases and a more dynamic feeling in the object is produced. However, a camera shake or the object shake easily arises.

There are two functions which can be conceived as a function of assisting panning. The first function is a function of detecting an image shake in an object and a camera and optically correcting the object shake in accordance with the image shake using a shift lens. The second function is a function of automatically setting a shutter speed so that an image shake amount of a background becomes constant.

Japanese Patent Laid-Open No. 2006-317848 discloses an imaging apparatus that detects a difference between an object speed and a camera shaking speed and correcting an image shake amount corresponding to the difference using a camera shake correction function. In addition, Japanese Unexamined Patent Publication No. 2008-136174 discloses an imaging apparatus of detecting a motion of a moving body inside a screen as a motion vector and calculating an exposure time at which a desired flow blurring width is acquired in accordance with the motion vector.

In Japanese Patent Laid-Open No. 2008-136174, panning photographing is performed by moving a correction lens in association with a motion of a moving body in a fixed state of the imaging apparatus and a difference between motion amounts of a main object (moving body) and a background (still body) is obtained as a motion vector in order to calculate an exposure time. However, for example, when the main object has low contrast, the motion vector may not be obtained with precision and it may be difficult to calculate an exposure time at which a desired flow blurring width is acquired.

SUMMARY OF THE INVENTION

The present invention provides an imaging apparatus capable of automatically adjusting an exposure time at the time of panning with precision.

According to an embodiment of the present invention, an imaging apparatus is provided that includes a camera body on which a lens device is detachably mounted; a shake detection unit configured to be inside the camera body; and a control unit configured to determine an exposure time at a time of panning, wherein the control unit determines the exposure time at the time of panning based on a shake detection signal outputted by the shake detection unit.

According to the present invention, an imaging apparatus is configured to be capable of automatically adjusting an exposure time at the time of panning with precision.

Further features of the present invention will become apparent from the following description of exemplary embodiments (with reference to the attached drawings).

BRIEF DESCRIPTION OF THE DRAWINGS

FIG. 11 is a diagram illustrating an example of a process of calculating a panning assistance shutter speed according to the third embodiment.

DESCRIPTION OF THE EMBODIMENTS (First Embodiment)

Figure 1:
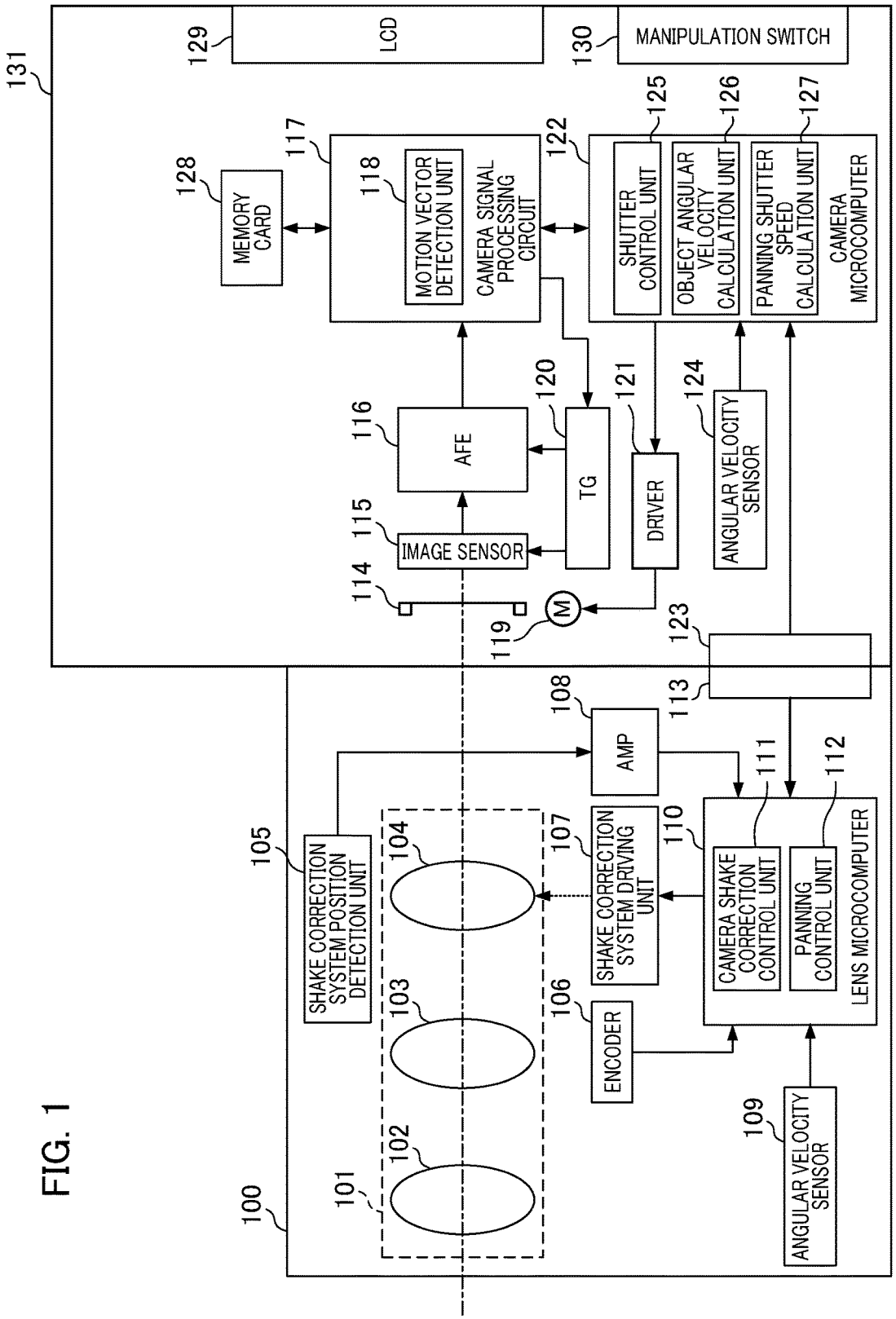
FIG. 1 is a diagram illustrating a configuration of an imaging apparatus according to a first embodiment.

FIG. 1 is a diagram illustrating a configuration of an imaging apparatus according to a first embodiment. The imaging apparatus illustrated in FIG. 1 includes an interchangeable lens 100 and a camera body 131. The interchangeable lens 100 is a lens device that is detachably mounted on the camera body 131. An interchangeable lens type imaging apparatus may also be an imaging apparatus such as a compact digital camera, a video camera, or a surveillance camera.

The interchangeable lens 100 includes a photographing lens unit 101. The photographing lens unit 101 includes a main imaging optical system 102, a zoom lens group 103 capable of changing a focal distance, and a shift lens group 104. The shift lens group 104 is moved in the vertical direction to an optical axis to optically correct an image shake with respect to an optical axis due to a shake of the imaging apparatus.

The interchangeable lens 100 includes a zoom encoder 106 that detects the position of a zoom lens group (hereinafter referred to as a "zoom lens") and a position sensor (encoder) 106 that detects the position of a shift lens group (hereinafter referred to as a "shift lens") 104. The interchangeable lens 100 includes an angular velocity sensor 109 which is a first shake detection unit detecting a shake applied to the imaging apparatus and a lens system control microcomputer (hereinafter referred to as a "lens microcomputer") 110. The interchangeable lens 100 includes a shake correction system driving unit 107 that drives the shift lens and an amplifier circuit 108 that amplifies an output of a shake correction system position detection unit 105 which is a position sensor of the shift lens. The interchangeable lens 100 includes a mounting contact unit 113 with the camera body 131.

The lens microcomputer 110 includes a camera shake correction control unit 111 that performs camera shake correction control and a panning control unit 112 that performs control for a panning mode. The lens microcomputer 110 also performs focus lens control and diaphragm control, which are not illustrated to simplify the drawing herein. To correct the camera shake, for example, detection and correction are performed on two orthogonal axes which are vertical and horizontal directions. Since the detection and the correction of the two axes are the same, only the detection and the correction of only one axis will be described herein. In this way, the imaging apparatus according to the present embodiment includes the image shake correction device that corrects the image shake by driving the optical element in a direction orthogonal to the optical axis.

The camera body 131 includes a shutter 114, an image sensor 115 such as a CMOS sensor, an analog signal processing circuit (AFE) 116, and a camera signal processing circuit 117. The camera body 131 includes a timing generator (TG) 120 that sets an operation timing of the image sensor 115 or the analog signal processing circuit 116. The camera body 131 includes a manipulation switch 130 that includes a power switch and a release switch. The camera body 131 includes a camera system control microcomputer (hereinafter referred to as a "camera microcomputer") 132 that controls the entire camera system, a driver 121 that drives a motor so that a shutter operation is performed, and a shutter driving motor 119.

The camera body 131 includes a memory card 128 that records a captured video, a liquid crystal panel (hereinafter referred to as an "LCD") 129 that monitors an image captured with the camera for use and displays the captured image, and a mounting contact unit 123 which is a contact unit with the interchangeable lens 100. The lens microcomputer 110 and the camera microcomputer 122 perform serial communication at a predetermined timing via the mounting contact units 113 and 123.

The camera signal processing circuit 117 includes a motion vector detection unit 118 that detects a motion of an object based on an image signal output from the image sensor. The camera microcomputer 122 includes a shutter control unit 125, an object angular velocity calculation unit 126 that calculates an angular velocity of a main object, and a panning shutter speed calculation unit 127.

In FIG. 1, when the camera is powered on by the manipulation switch 130, the camera microcomputer 122 detects a change in a state. Then, power is supplied to each circuit of the camera body 131 and initial setting is performed under the control of the camera microcomputer 122. Power is supplied to the interchangeable lens 100 and initial setting in the interchangeable lens 100 is performed under the control of the lens microcomputer 110. Then, communication starts at a predetermined timing between the lens microcomputer 110 and the camera microcomputer 122. In this communication, a camera state, photographing setting, and the like are transmitted from the camera to the lens at necessary timings and focal distance information of the lens, angular velocity information, and the like are transmitted from the lens to the camera at necessary timings. When the panning mode is not selected, the angular velocity sensor 109 detects a shake applied to the camera due to a camera shake or the like inside the interchangeable lens 100. Then, the camera shake correction control unit 111 performs an operation of correcting the image shake caused due to the detected shake (a camera shake correction operation).

Figure 2:
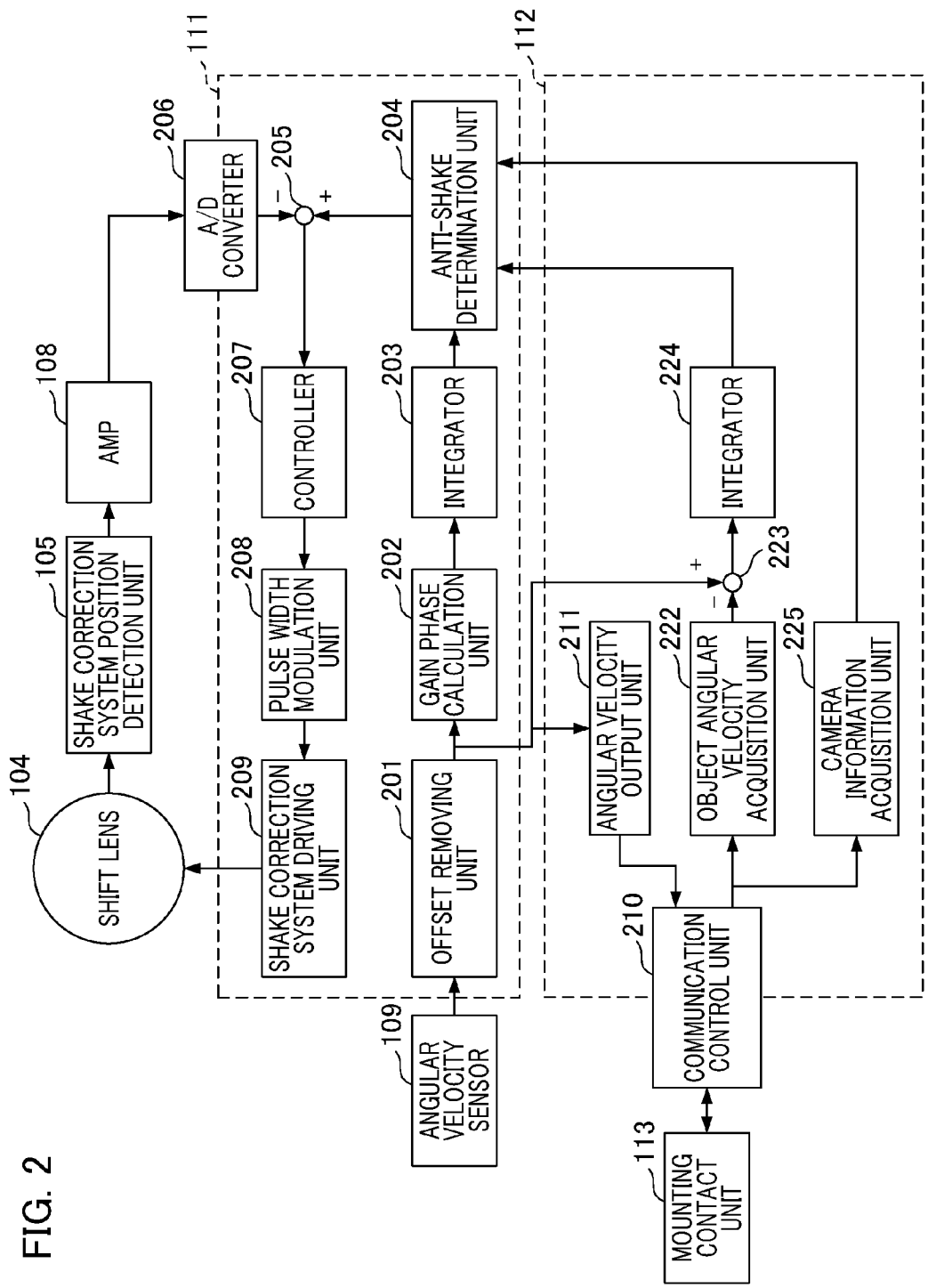
FIG. 2 is a diagram illustrating an example of a configuration of an imaging apparatus related to a camera shake correction operation.

FIG. 2 is a diagram illustrating an example of a configuration of an imaging apparatus related to a camera shake correction operation. In the configurations illustrated in FIG. 2, the same reference numerals are given to the common configurations to FIG. 1 and the description thereof will be omitted. An offset removing unit 201 included in the camera shake correction control unit 111 is a filter arithmetic unit configured to include, for example, a high pass filter (hereinafter referred to as an HPF) and removes a direct-current component contained in an output of the angular velocity sensor 109. A gain phase calculation unit 202 is configured to include an amplifier that amplifies angular velocity data from which the direct-current component is removed by the offset removing unit 201 with a predetermined gain and a phase compensation filter.

An integrator 203 has a function capable of changing characteristics at any frequency band and integrates an output of the gain phase calculation unit 202 to calculate a driving amount of the shift lens 104. An anti-shake control determination unit 204 changes a control signal for driving the shift lens 104 in accordance with an output of a camera information acquisition unit 225. In the case of the panning mode, the anti-shake control determination unit 204 adopts an output of an integrator 224 calculated by the panning control unit 112. In the case of an operation mode other than the panning mode, the anti-shake control determination unit 204 adopts an output of an integrator 203 calculated by the camera shake correction control unit 111.

A subtractor 205 subtracts data, which is obtained when an A/D converter 206 digitizes a value obtained by amplifying an output of the shake correction system position detection unit 105 detecting a position of the shift lens 104 by the AMP 108, from an output of the anti-shake control determination unit 204 and outputs the subtracted data to a controller 207. The controller 207 is configured to include an amplifier that amplifies the input data with a predetermined gain and a phase compensation filter. Deflection data which is an output of the subtractor 205 is subjected to signal processing by the amplifier and the phase compensation filter of the controller 207, and then is output to a pulse width modulation unit 208. The pulse width modulation unit 208 modulates the output data of the control filter 207 into a waveform for changing a duty ratio of a pulse wave (that is a PWM waveform) and supplies the modulated data to a shake correction system driving unit 209. The shake correction system driving unit 209 is an audio coil type motor for driving the shift lens 104 and drives the shift lens 104 in a direction vertical to the optical axis in accordance with the output of the pulse width modulation unit 208.

Next, the panning control unit 112 will be described in detail. When the panning mode is set by the manipulation switch 130, the camera microcomputer 122 is switched to panning control. Information indicating that the camera microcomputer 122 is switched to the panning control is transmitted from the camera microcomputer 122 to the lens microcomputer 110, so that the lens microcomputer 110 transitions to control of the panning mode.

The camera information acquisition unit 225 acquires, for example, release information and setting information of the panning mode. The angular velocity output unit 211 outputs angular velocity data (a shake detection signal) of the angular velocity sensor 109 inside the interchangeable lens 100 to the camera microcomputer 122. The object angular velocity acquisition unit 222 acquires angular velocity data of a main object calculated by the object angular velocity calculation unit 126 included in the camera body 131 via the mounting contact unit 113 or the communication control unit 210. A subtractor 223 calculates a difference between an angular velocity detected in the interchangeable lens 100 and an angular velocity of the main object detected in the camera body 131 and the integrator 224 integrates deflection.

A method of calculating an angular velocity of the main object will be described. During setting of the panning mode, the camera body 131 outputs a motion vector of an object detected by the motion vector detection unit 118 in the camera signal processing circuit 117 from captured video information. The camera body 131 receives angular velocity data detected by the angular velocity sensor 109 in the interchangeable lens 100 from the lens microcomputer 110.

In panning photographing, there are two kinds of vectors, the vector of the object which a photographer attempts to image and a vector of a flowing background, as vectors output from the motion vector detection unit 118. In this example, since panning is a purpose, the object vector is extracted between the two kinds of detected motion vectors.

Figure 3:
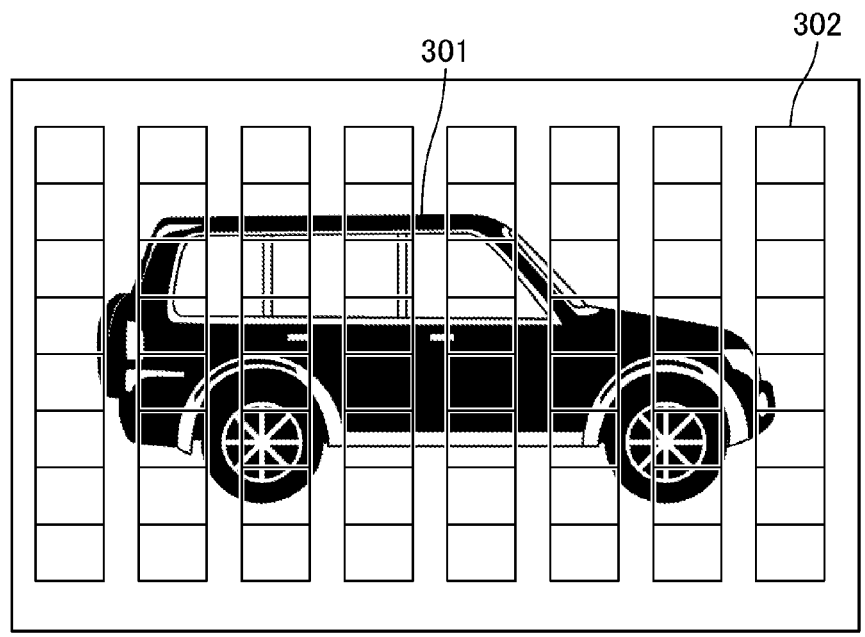
FIG. 3 is a diagram illustrating an example in which a motion vector is detected from a photographed image.

FIG. 3 is a diagram for describing an example in which a motion vector is detected from a photographed image. In the panning photographing scene, the motion vector detection unit 118 detects motion vectors by comparing with an image before one frame in a motion vector detection block 302 (for example, an array of 8 rows and 8 columns). Thus, the motion vector of an object 301 (object vector) and a motion vector of a background (background vector) are detected. The detected motion vector is transmitted to the camera microcomputer 122.

Figure 4:
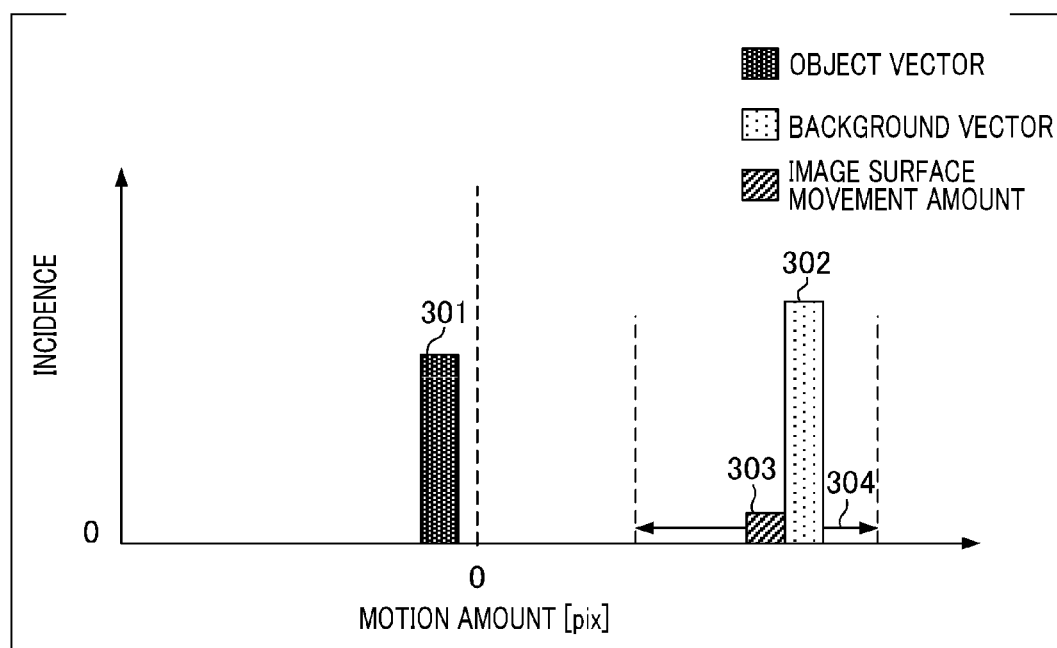
FIG. 4 is a diagram illustrating an example of display of a histogram of motion vectors.

FIG. 4 is a diagram illustrating an example of display of a histogram of the motion vectors. In the present embodiment, the object angular velocity calculation unit 126 of the camera microcomputer 122 uses angular velocity data which is an output of the angular velocity sensor 109 in order to accurately separate the object vector from the background vector. When a photographer skillfully follows the object, the object vector is near 0 pix. However, when a photographer is unfamiliar with photographing, a motion amount of the object may increase and the object vector is away from 0 pix. Thus, the object vector may not be distinguished from the background vector. Accordingly, in the present embodiment, the object angular velocity calculation unit 126 converts the angular velocity data which is an output of the angular velocity sensor 109 into an image surface movement amount 303 using a focal distance or frame rate data.

The object angular velocity calculation unit 126 determines that a vector group which falls within a given range (background range) 304 is the background vector 302 using the image surface movement amount as a reference, and determines that a vector group which falls out of the given range 304 is the object vector 301. When there are a plurality of objects in a screen, there are a plurality of object vectors. In this case, the object angular velocity calculation unit 126 adopts the object vector closest to a focus frame of the camera. This is because a photographer necessarily puts a focus frame on a object which the photographer desires to photograph regardless of the panning photographing. A value of the object vector determined by the foregoing method is a movement amount on an image surface of the main object. Angular velocity data (shake detection signal) output by the angular velocity sensor 124 which is a second shake detection unit detecting a shake of the camera body 131 maybe used as the angular velocity data applied to the histogram.

On the other hand, the angular velocity data received from the lens corresponds to a panning speed of the camera. Accordingly, the object angular velocity calculation unit 126 calculates a difference between the received angular velocity data and angular velocity data calculated from a movement amount on the image surface of the main object and a current focal distance of the lens. The calculated result becomes movement angular velocity data of the main object with respect to the camera. The camera microcomputer 122 transmits the calculated angular velocity data of the main object to the lens microcomputer 110.

Next, calculation of a panning shutter speed will be described. A panning shutter speed is an exposure time at the time of panning. At the time of setting the panning mode, the panning shutter speed calculation unit 127 included in the camera body 131 calculates a panning shutter speed TV. The panning shutter speed calculation unit 127 calculates the panning shutter speed TV using (Formula 1) based on a background flow effect, focal distance data in the interchangeable lens, an output (a camera angular velocity) of the angular velocity sensor 124 in the camera body, and an output (an angular velocity of a main object) of the object angular velocity calculation unit 126. As the background flow effect, a value set in the manipulation switch 130 by the photographer is used. The focal distance data in the interchangeable lens 100 can be obtained through communication via the mounting contact unit 123.

$$TV = \alpha \cdot f / (\omega g - \omega s) \quad \text{(Formula 1)}$$

Here, $\alpha$ is a background flow effect, f is a focal distance, $\omega g$ is a camera angular velocity, and $\omega s$ is an angular velocity of a main object.

The background flow effect $\alpha$ is a value set in advance as a predetermined value so that a movement amount of a background portion on an image surface is, for example, 800 μm. The background flow effect level may be set such that a plurality of effects such as small, intermediate, and large effects, can be set. In this way, a shutter speed is automatically set in the camera body 131 in the panning mode so that a background flow level is constant regardless of a panning speed of a photographer. Thus, even a photographer who is unfamiliar with panning photographing can simply set a shutter speed appropriate for the panning photographing.

In the present embodiment, the reason why an output of the angular velocity sensor 124 in the camera body 131 is used to calculate a panning shutter speed will be described. A case in which an interchangeable lens not corresponding to the panning mode, for example, an interchangeable lens on which a shift lens for optical shake correction is not mounted, is mounted on the camera body 131 will be assumed. The fact that the shift lens for optical shake correction is not mounted on the interchangeable lens means that an angular velocity sensor is not in the interchangeable lens. Accordingly, in this case, this is because the camera body 131 may not acquire angular velocity data of the interchangeable lens side and may not calculate a panning shutter speed.

Figure 5:
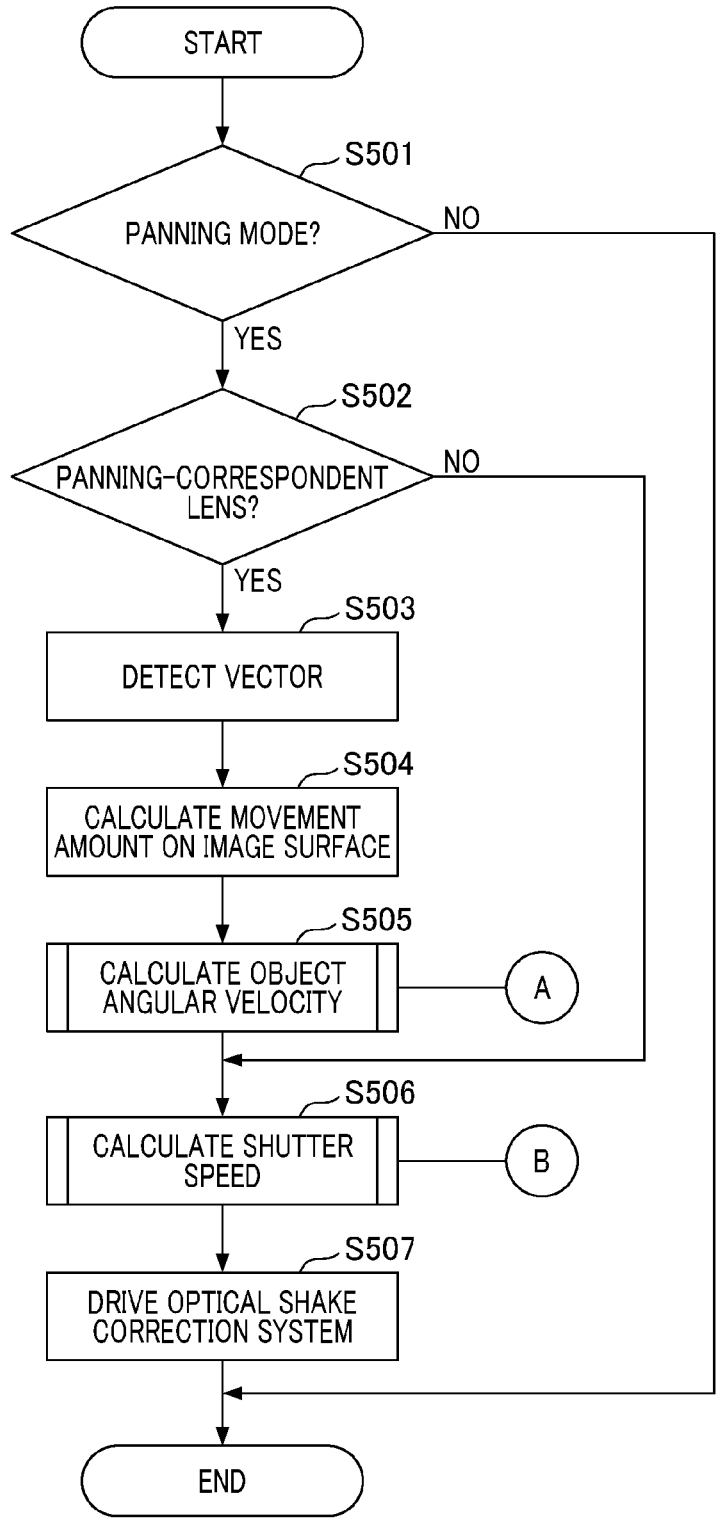
FIG. 5 is a diagram illustrating an example of a process of calculating a panning assistance shutter speed.
Figure 6:
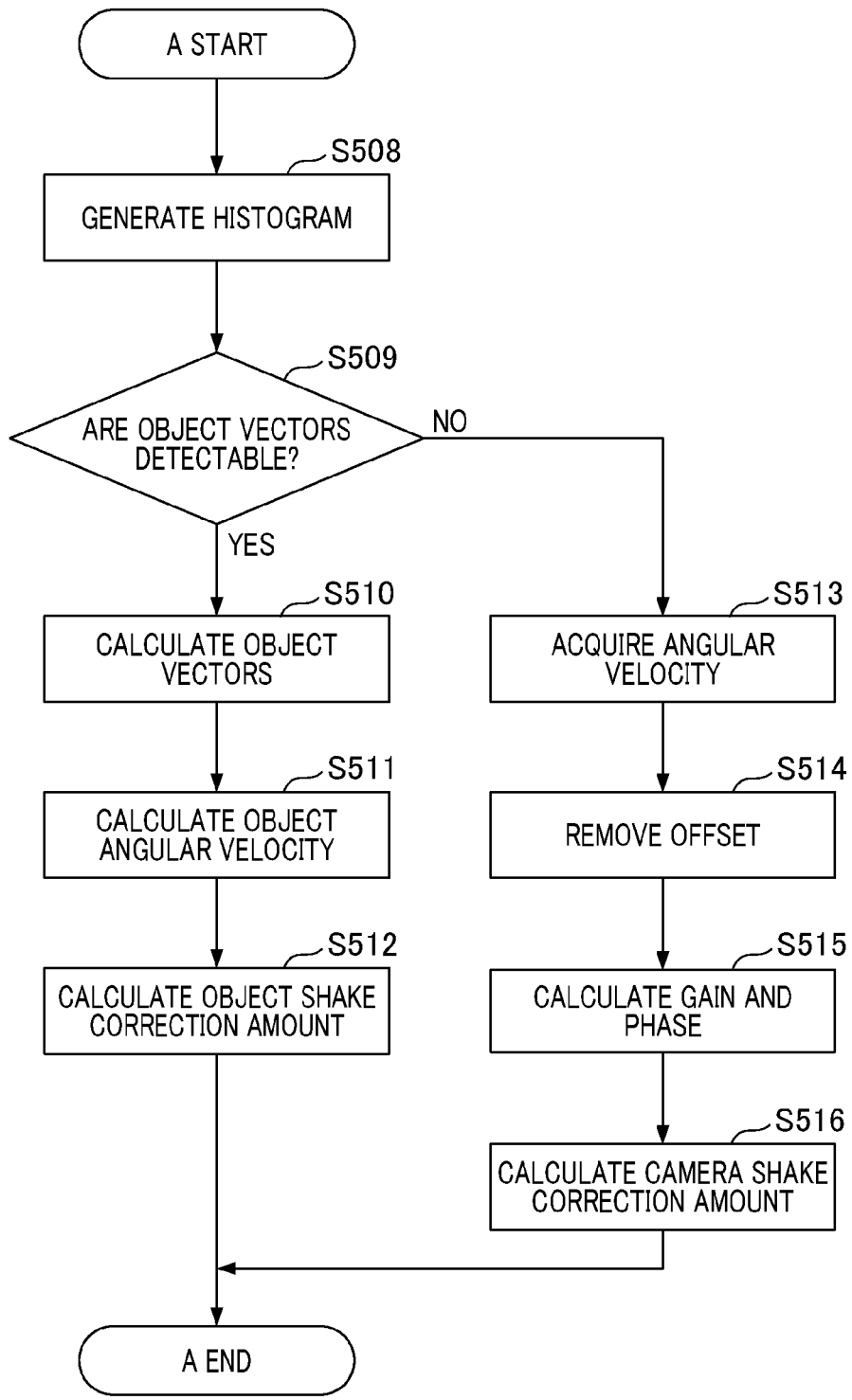
FIG. 6 is a diagram illustrating an example of the process of calculating a panning assistance shutter speed.
Figure 7:
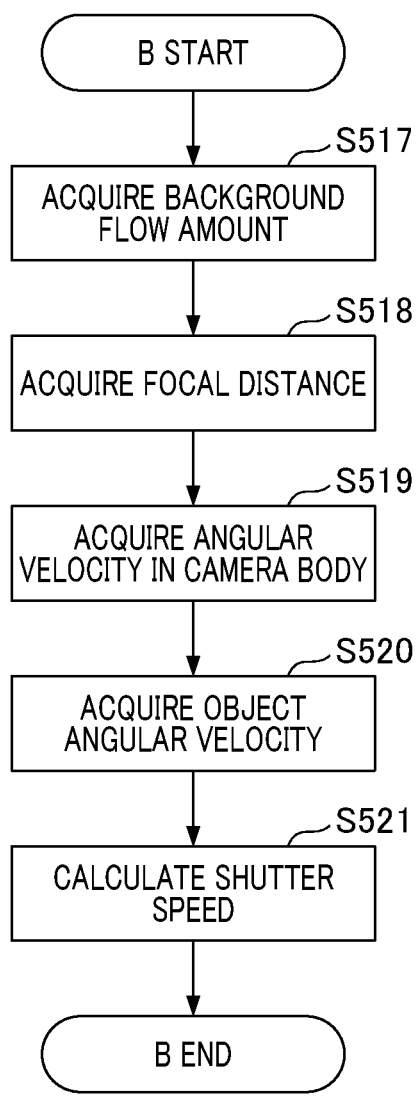
FIG. 7 is a diagram illustrating an example of the process of calculating a panning assistance shutter speed according to the first embodiment.

FIGS. 5 to 7 are flowcharts illustrating an example of a process of calculating a panning shutter speed. In step S501 of FIG. 5, the camera microcomputer 122 determines whether or not the photographer sets the panning mode with the manipulation switch 130. When the panning mode is set, the process proceeds to step S502. When an operation mode other than the panning mode is set, control of the panning mode is not performed.

Subsequently, in step S502, the camera microcomputer 122 determines whether or not the interchangeable lens 100 is an interchangeable lens corresponding to the panning mode based on a signal transmitted from the lens microcomputer 110. When the interchangeable lens 100 is an interchangeable lens corresponding to the panning mode, the process proceeds to step S503. When the interchangeable lens 100 is an interchangeable lens not corresponding to the panning mode, the process proceeds to step S506.

In step S503, the motion vector detection unit 118 detects a motion amount in a screen as a motion vector. Subsequently, in step S504, the object angular velocity calculation unit 126 calculates a movement amount on an image surface of the main object. Then, in step S505, the object angular velocity calculation unit 126 calculates the object angular velocity.

Subsequently, in step S506, the panning shutter speed calculation unit 127 calculates a panning shutter speed. A driving amount of the shift lens during an exposure period is decided from the object angular velocity obtained in step S505 and the panning shutter speed obtained in step S506. Then, in step S507, the lens microcomputer 110 drives the shift lens 104.

FIG. 6 is a flowchart for describing the process of calculating an angular velocity of a object in step S505 of FIG. 5. In step S508, the object angular velocity calculation unit 126 performs histogram calculation of all the vectors detected in step S503. Subsequently, in step S509, the object angular velocity calculation unit 126 determines whether or not object vectors are detected. When the object vectors are detected, the process proceeds to step S510. When the object vectors are not detected, the process proceeds to step S513. Specifically, when the vector group out of the given range is a predetermined incidence or more (for example, 4 or more) using the movement amount on the image surface calculated in step S504 as a reference, the object vectors are determined to be detected.

In step S510, the object angular velocity calculation unit 126 obtains an average of the object vectors determined in step S509. Subsequently, in step S511, the average of the object vectors obtained in S510 is converted into the object angular velocity using the focal distance and the frame rate data.

In step S512, the object angular velocity calculation unit 126 adds an output of the angular velocity output unit 211 transmitted from the lens microcomputer 110 to the object angular velocity converted in step S511 and transmits the added output to the lens microcomputer 110. Then, the panning control unit 112 causes the integrator 224 to integrate a difference between the transmitted value and the angular velocity data of the angular velocity sensor 109 and sets the integrated value as a target control value of object shake correction control (object shake correction amount).

In step S513, the control of the shift lens 104 is switched to the camera shake correction control since the object vectors are not detected in step S509. Accordingly, the camera shake correction control unit 111 acquires angular velocity data which is an output of the angular velocity sensor 109 in the interchangeable lens 100.

Subsequently, in step S514, the camera shake correction control unit 111 blocks a low-frequency component contained in the angular velocity data, for example, using the high pass filter that has the function capable of changing characteristics at any frequency band, and then outputs the signal with a high-frequency band. Thus, a direct-current component (offset) superimposed on the angular velocity data is removed. Subsequently, in step S515, the gain phase calculation unit 202 of the camera shake correction control unit 111 causes the amplifier to amplifier the angular velocity data from which the offset is removed at a predetermined gain and causes the phase compensation filter to perform signal processing. Then, the camera shake correction control unit 111 causes the integrator 203 to integrate the angular velocity data objected to the signal processing in step S515 and sets the integrated value as a target control value of the camera shake correction control (camera shake correction amount).

FIG. 7 is a flowchart for describing the process of calculating a shutter speed in step S506 of FIG. 5. The process of FIG. 7 is performed at the time of panning. In step S517, the panning shutter speed calculation unit 127 acquires a background flow level set by the camera microcomputer 122 in response to a manipulation performed by the photographer using the manipulation switch 130. Subsequently, in step S518, the camera microcomputer 122 acquires the focal distance data transmitted from the lens microcomputer 110 via the mounting contact units 113 and 123.

Subsequently, in step S519, the panning shutter speed calculation unit 127 acquires the angular velocity data of the angular velocity sensor 124 in the camera body 131. Then, the process proceeds to step S520.

Subsequently, in step S520, the panning shutter speed calculation unit 127 acquires the angular velocity data of the object calculated in step S511 of FIG. 6 from the object angular velocity calculation unit 126. When the object vectors are not detected in step S509, data in which the object angular velocity is 0 dps is acquired.

In step S521, the panning shutter speed calculation unit 127 calculates the panning shutter speed using (Formula 1) based on the background flow level, the focal distance, the object angular velocity, and the angular velocity in the camera body. That is, when the angular velocity sensor is in the camera body 131, the camera microcomputer 122 decides an exposure time using an output of the angular velocity sensor in the camera body 131 regardless of whether the interchangeable lens 100 mounted on the camera body 131 corresponds to the panning.

As described above, according to the present embodiment, even when the interchangeable lens including no angular velocity sensor is mounted on the camera body, the panning shutter speed can be calculated with precision using the angular velocity sensor in the camera body. According to the present embodiment, even when the interchangeable lens including the angular velocity sensor is mounted on the camera body, the angular velocity sensor in the camera body is used. The angular velocity sensor of the interchangeable lens has different performance depending on the kind of interchangeable lens. Therefore, when a panning shutter speed is calculated using the angular velocity sensor of the interchangeable lens, a panning shutter speed calculated according to a kind of interchangeable lens is considered to vary even in the same situation. In the present embodiment, even when the interchangeable lens including the angular velocity sensor is mounted on the camera body, a panning shutter speed can be calculated stably using the angular velocity sensor in the camera body since the angular velocity sensor to be used is the same despite a change in the kind of the interchangeable lens.

(Second Embodiment)

Figure 8:
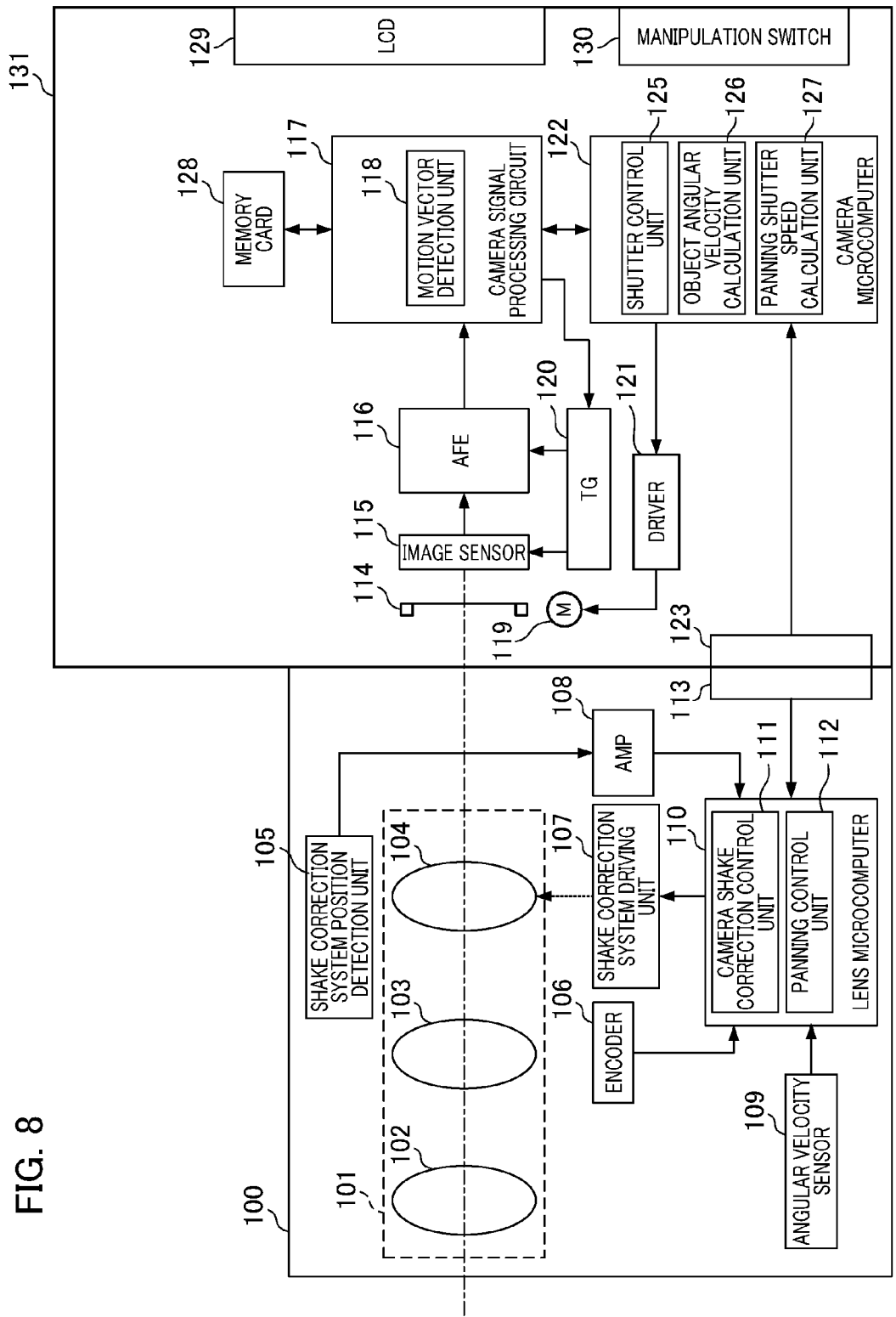
FIG. 8 is a diagram illustrating a configuration of an imaging apparatus according to a second embodiment.

In the first embodiment, the case in which the angular velocity sensor is in the camera body has been described. In contrast, in a second embodiment, a case in which no angular velocity sensor is in the camera body will be described. FIG. 8 is a diagram illustrating a configuration of an imaging apparatus according to the second embodiment.

Figure 9:
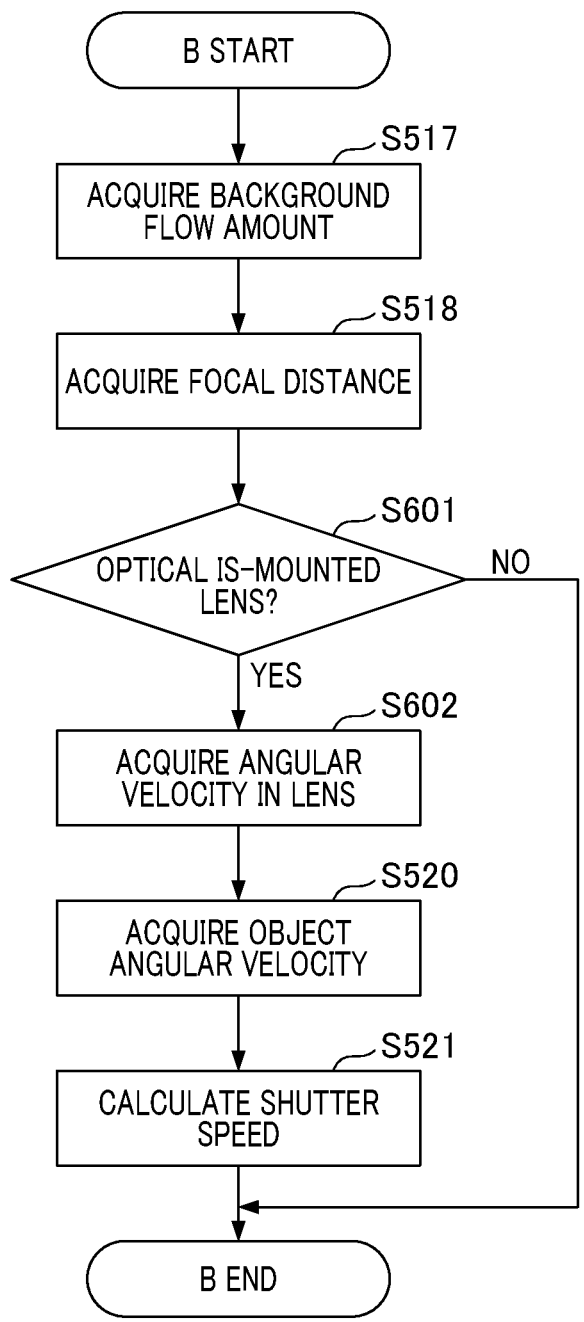
FIG. 9 is a diagram illustrating an example of a process of calculating a panning assistance shutter speed according to the second embodiment.

The imaging apparatus is different from the imaging apparatus illustrated in FIG. 1 according to the first embodiment in that no angular velocity sensor is in the camera body. Therefore, the detailed description thereof will be omitted. In the present embodiment, the process of calculating a shutter speed in step S506 of FIG. 5 is different from that of the first embodiment. Therefore, the description will be made below with reference to FIG. 9. In FIG. 9, the same step numerals are given in steps of performing the same processes as those of the flowchart of FIG. 7.

Subsequently to step S518, in step S601, the camera microcomputer 122 determines whether or not the shift lens (IS lens) 104 is mounted on the interchangeable lens 100. The fact that the shift lens 104 is not mounted on the interchangeable lens 100 means that no angular velocity sensor is mounted on the interchangeable lens 100. Accordingly, when the shift lens 104 is not mounted on the interchangeable lens 100, the process ends. The fact that the shift lens 104 is mounted on the interchangeable lens 100 means that the angular velocity sensor 109 is mounted on the interchangeable lens 100. Accordingly, in this case, the process proceeds to step S602. In step S602, the panning shutter speed calculation unit 127 acquires angular velocity data of the angular velocity sensor 109.

When the angular velocity data in the interchangeable lens 100 (inside the lens device) is acquired in step S602, the panning shutter speed calculation unit 127 performs the following process in step S521. The panning shutter speed calculation unit 127 calculates a panning shutter speed using (Formula 1) based on the background flow level, the focal distance, the object angular velocity, and the angular velocity in the interchangeable lens 100.

When the shift lens 104 is not mounted on the interchangeable lens 100, the panning shutter speed calculation unit 127 converts a background vector extracted based on the histogram generated in step S508 into a background angular velocity. The panning shutter speed calculation unit 127 calculates a panning shutter speed based on the background angular velocity. A value (for example, 1/60 seconds) programmed in advance by the panning shutter speed calculation unit 127 may also be set.

As described above, according to the present embodiment, even when no angular velocity sensor is in the camera body, the panning shutter speed can be calculated with precision using the angular velocity sensor of the interchangeable lens. When no angular velocity sensor is in any of the camera body and the interchangeable lens, a panning shutter speed is calculated using motion vectors detected from an image. When the panning shutter speed is calculated using the motion vectors, there is concern of the object having low contrast and detection precision of the motion vector deteriorating. However, the shutter speed corresponding to the background flow level intended by a photographer can be calculated compared to a preset shutter speed.

(Third Embodiment)

When the panning shutter speed is calculated, the imaging apparatus according to a third embodiment compares the output of the angular velocity sensor 124 in the camera body 131 to the output of the angular velocity sensor 109 in the interchangeable lens 100. Then, the output used to calculate the panning shutter speed is selected based on the comparison result.

Figure 10:
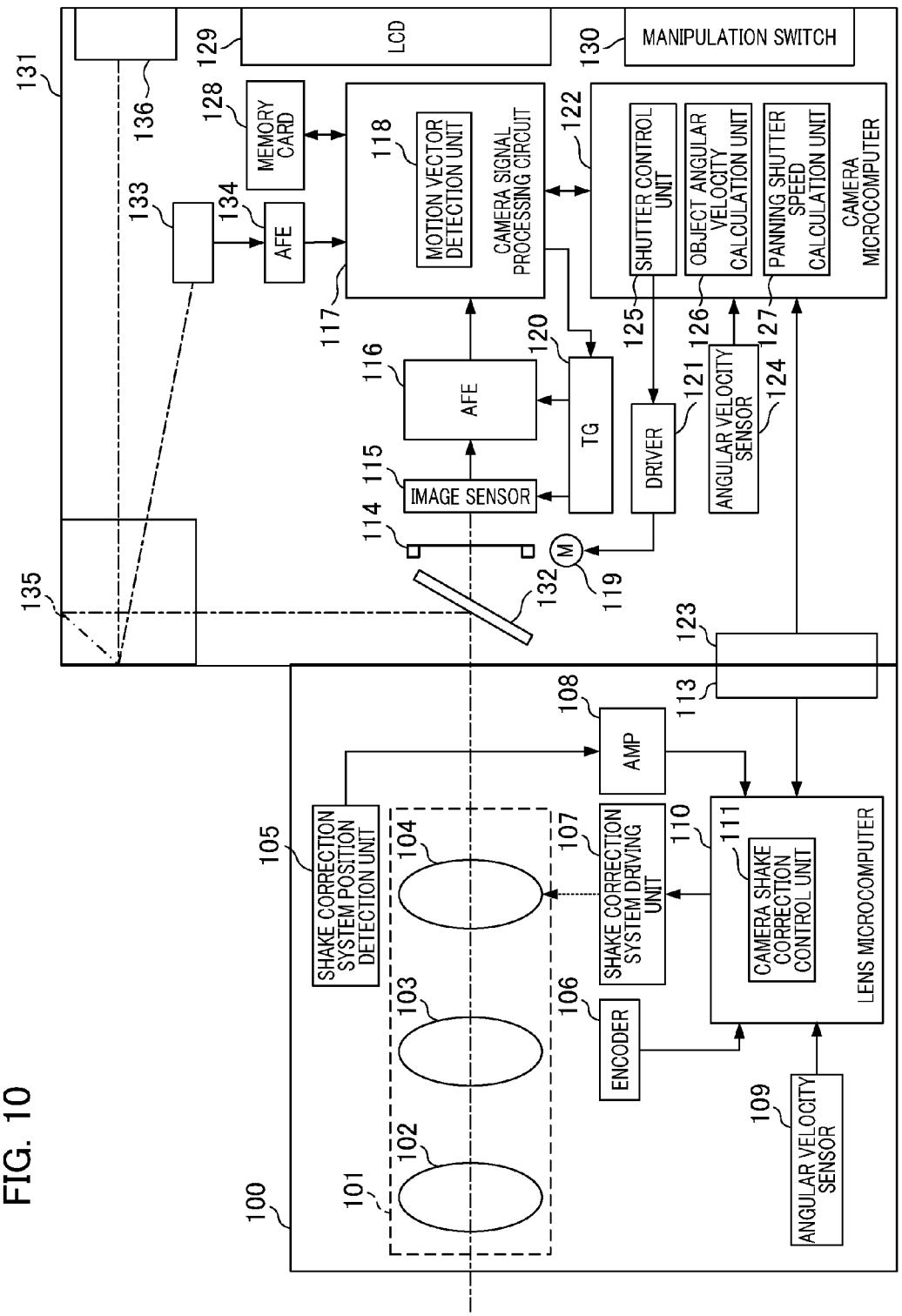
FIG. 10 is a diagram illustrating a configuration of an imaging apparatus according to a third embodiment.

FIG. 10 is a diagram illustrating a configuration of the imaging apparatus according to a third embodiment. In the third embodiment, an optical finder 136, a main mirror 132, a pentaprism unit 135, a light measurement sensor 133, and analog signal processing circuit (AFE) 134 for an output of the light measurement sensor 133 are mounted on the camera body 131, and thus a so-called single-lens reflex camera is assumed. A part of a light flux collected by the photographing lens unit 101 is reflected by the main mirror 132 to be guided to the pentaprism unit 135. Then, the image is formed on the light measurement sensor 133 and the optical finder 136.

In the single-lens reflex camera, the main mirror 132 is driven at the time of exposure and vibration is detected by the angular velocity sensor 124 in the camera body 131 in some cases. That is, an output of the angular velocity sensor 124 in the camera body 131 is different from the original value. When the value is used at the time of calculating a panning assistance shutter speed, an error occurs in the calculated shutter speed. Accordingly, in the third embodiment, a process of calculating a shutter speed is performed in the flowchart of FIG. 11. In FIG. 11, the same step numerals are given in steps of performing the same processes as those of the flowcharts of FIGS. 7 and 9.

Subsequently to step S518, in step S701, the camera microcomputer 122 determines whether or not the main mirror 132 is vibrating. Whether the main mirror 132 is vibrating is determined using an output of the angular velocity sensor 124 in the camera body 131. For example, when a variation in the output of the angular velocity sensor 124 satisfies a predetermined condition (a threshold or more), it is determined that the main mirror 132 is vibrating.

Then, the camera microcomputer 122 switches to proceed to step S519 or proceed to step S601 depending on whether the main mirror 132 is vibrating. As described above, according to the present embodiment, a panning shutter speed can be calculated using the angular velocity sensor appropriate for a situation when the angular velocity sensor is in either the camera body or the interchangeable lens. Instead of the determination of whether the main mirror 132 is vibrating in step S701, the panning shutter speed calculation unit 127 may compare an output of the angular velocity sensor 109 in the interchangeable lens 100 to an output of the angular velocity sensor 124 in the camera body 131. The outputs may be compared for a predetermined period and the angular velocity sensor of which the output is more stable for a predetermined period may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-167910, filed Aug. 30, 2016 which is hereby incorporated by reference wherein in its entirety.

What is claimed is:

1. An imaging apparatus comprising:
   a camera body on which a lens device is detachably mounted;
   a shake detector configured to be inside the camera body; and
   a processor, wherein the processor functions according to a program stored in a memory as a control unit configured to determine an exposure time at a time of panning,
   wherein the control unit determines the exposure time at the time of panning using a shake detection signal output by the shake detector irrespective of whether the lens device mounted on the camera body corresponds to the panning.

2. The imaging apparatus according to claim 1, wherein the processor further functions according to a program stored in a memory as a setting unit configured to set a flow level of a background, and
wherein the control unit determines the exposure time at the time of panning based on focal distance information, the flow level of the background set by the setting unit, and the shake detection signal.

3. The imaging apparatus according to claim 1, wherein the processor further functions according to a program stored in a memory as units comprising:
a vector detection unit configured to detect a motion vector from a photographed image;
an extraction unit configured to extract an object vector from the motion vector; and
a calculation unit configured to calculate a correction amount used to correct an object shake based on the object vector.

4. A method of controlling an imaging apparatus including a camera body on which a lens device is detachably mounted, the method comprising:
determining an exposure time at a time of panning using a shake detection signal output by a shake detector inside the camera body irrespective of whether the lens device mounted on the camera body corresponds to the panning.

5. An imaging apparatus comprising:
a camera body on which a lens device is detachably mounted;
a shake detector configured to be inside the camera body; and
a processor, wherein the processor functions according to a program stored in a memory as a control unit configured to determine an exposure time at a time of panning,
wherein the control unit determines the exposure time at the time of panning based on a shake detection signal outputted by the shake detector, and
wherein, when the lens device mounted on the camera body corresponds to the panning, the control unit selects a shake detection signal to be used to determine the exposure time at the time of panning based on a comparison result of the shake detection signal output by the shake detector and a shake detection signal output by a second shake detector, which is a shake detector of the lens device.

6. The imaging apparatus according to claim 5, wherein the control unit determines the exposure time at the time of panning using the shake detection signal of which an output is stable among (a) the shake detection signal output by the shake detector and (b) the shake detection signal output by the second shake detector.

7. An imaging apparatus comprising:
a camera body on which a lens device is detachably mounted;
a shake detector configured to be inside the camera body; and
a processor, wherein the processor functions according to a program stored in a memory as units comprising:
(1) a control unit configured to determine an exposure time at a time of panning, and
(2) a setting unit configured to set a flow level of a background,
wherein the control unit determines the exposure time at the time of panning based on focal distance information, the flow level of the background set by the setting unit, and the shake detection signal outputted by the shake detector.

8. A method of controlling an imaging apparatus including a camera body on which a lens device is detachably mounted, the method comprising:
determining an exposure time at a time of panning based on a shake detection signal output by a shake detector inside the camera body; and
selecting a shake detection signal to be used to determine the exposure time at the time of panning based on a comparison result of the shake detection signal output by the shake detector and a shake detection signal output by a second shake detector, which is a shake detector of the lens device, when the lens device mounted on the camera body corresponds to the panning.

9. A method of controlling an imaging apparatus including a camera body on which a lens device is detachably mounted, the method comprising:
setting a flow level of a background; and
determining an exposure time at a time of panning based on focal distance information, the set flow level of the background, and a shake detection signal output by a shake detector inside the camera body.

* * * * *